TRANSVERSAL EQUALIZER FOR DIGITAL TRANSMISSION SYSTEMS WHEREIN POLARITY OF TIME-SPACED PORTIONS OF OUTPUT SIGNAL CONTROLS CORRESPONDING MULTIPLIER SETTING

Filed Sept. 16, 1964 6 Sheets-Sheet 1

INVENTORS F. K. BECKER
R. W. LUCKY
E. PORT
BY J. P. Kearns
ATTORNEY

Dec. 13, 1966 F. K. BECKER ETAL 3,292,110

TRANSVERSAL EQUALIZER FOR DIGITAL TRANSMISSION SYSTEMS WHEREIN POLARITY OF TIME-SPACED PORTIONS OF OUTPUT SIGNAL CONTROLS CORRESPONDING MULTIPLIER SETTING

'iled Sept. 16, 1964

6 Sheets-Sheet 2

Dec. 13, 1966 F. K. BECKER ET AL 3,292,110

TRANSVERSAL EQUALIZER FOR DIGITAL TRANSMISSION SYSTEMS WHEREIN POLARITY OF TIME-SPACED PORTIONS OF OUTPUT SIGNAL CONTROLS CORRESPONDING MULTIPLIER SETTING

Filed Sept. 16, 1964

6 Sheets-Sheet 3

Dec. 13, 1966 F. K. BECKER ETAL 3,292,110

TRANSVERSAL EQUALIZER FOR DIGITAL TRANSMISSION SYSTEMS
WHEREIN POLARITY OF TIME-SPACED PORTIONS OF OUTPUT
SIGNAL CONTROLS CORRESPONDING
MULTIPLIER SETTING

Filed Sept. 16, 1964 6 Sheets-Sheet 4

TRANSVERSAL EQUALIZER FOR DIGITAL TRANSMISSION SYSTEMS WHEREIN POLARITY OF TIME-SPACED PORTIONS OF OUTPUT SIGNAL CONTROLS CORRESPONDING MULTIPLIER SETTING

Filed Sept. 16, 1964 6 Sheets-Sheet 5

TRANSVERSAL EQUALIZER FOR DIGITAL TRANSMISSION SYSTEMS WHEREIN POLARITY OF TIME-SPACED PORTIONS OF OUTPUT SIGNAL CONTROLS CORRESPONDING MULTIPLIER SETTING

Filed Sept. 16, 1964 6 Sheets-Sheet 6

United States Patent Office 3,292,110
Patented Dec. 13, 1966

3,292,110
TRANSVERSAL EQUALIZER FOR DIGITAL TRANSMISSION SYSTEMS WHEREIN POLARITY OF TIME-SPACED PORTIONS OF OUTPUT SIGNAL CONTROLS CORRESPONDING MULTIPLIER SETTING

Floyd K. Becker, Colts Neck, and Robert W. Lucky and Erich Port, Red Bank, N.J., assignors to Bell Telephone Laboratories, Incorporated, New York, N.Y., a corporation of New York Filed Sept. 16, 1964, Ser. No. 396,836
19 Claims. (Cl. 333—18)

This invention relates to the correction of the distorting effects of transmission media of limited frequency bandwidth on data intelligence signals and particularly to the rapid automatic equalization of such distorting effects in the voice channels of the telephone network.

In order to achieve reliable data communication over the switched telephone network or lower grade private lines at speeds in excess of 2000 bits per second, it is necessary that some form of adjustable delay and amplitude distortion correction be provided. For switched network application equalization must be performed at the start of each call. Time consumed in adjusting variable equalizers by conventional methods detracts from the advantage of using a higher bit rate for data calls of short duration. It is desirable, therefore, that the equalizer be quickly adjustable to its optimum setting in the smallest fraction of available calling time. It is further desirable that little or no skill or personal judgment be required of the user.

As mentioned in this specification, data is intelligence which is capable of being encoded in digital form. It is contrasted with speech signals carried by a telephone channel which are continuous and analog in nature. It includes the type of intelligence carried by a telegraph channel and also the primarily numerical intelligence suitable for the control of, or for entry into, automatic calculating or data processing equipment.

The principal distorting effect of a transmission medium on a substantially instantaneous pulse signal having a theoretically infinite range of frequency components or on a band-limited signal of finite duration is due to its nonuniform delay and amplitude characteristics. As a result the several frequency components originally generated in zero or brief finite time are widely dispersed in finite time into overlapping relationship with frequency components of adjacent pulses. This spreading of signal frequency components is in part due to the so-called velocity dispersive effect. In addition, the several frequencies are subject to different degrees of attenuation. The decision problem at a receiver of pulses distorted both in phase and amplitude becomes practically insoluble at pulse rates exceeding the bandwidth available in the transmission medium in the absence of equalization. However, with optimum equalization even multilevel decisions are feasible and an effective pulse rate exceeding by several times the available bandwidth can be realized.

Numerous networks are known for the correction of signal distortions. These may broadly be divided into frequency and time domain networks. Frequency domain networks are composed of inductors, capacitors and resistors arranged for attenuating and delaying received signals in complementary relation to the attenuation and delay imposed by the distorting medium. Once designed to correct a particular distortion characteristic, frequency domain networks are disadvantageously inflexible and susceptible only to minor adjustment. Hence, they are imperfectly suited to accommodate a changeable medium, such as the telephone network, whose characteristics vary with every call set-up.

Time domain networks supply correcting signals to be applied in opposition to the signal waveshape distortions so as to achieve a desired waveform. Transversal filters are examples of time domain networks which have particular application to the correction of distortion in digital data communication systems. A transversal filter comprises a plurally tapped delay line having a uniform delay for all signal frequencies within the passband of the transmission medium and, desirably, a total delay at least as great as the dispersion imposed by the transmission medium upon significant frequency components of signals lying within the transmission passband of the medium. The tap spacing for digital systems is chosen equal to the time interval at which successive signal samples are to be taken, that is, the reciprocal of the bit rate. Each tap is connected to a summing bus through a variable resistive attenuator or multiplier including an inverter. The effective multiplying factor is preferably adjustable over a range between plus and minus unity. The attenuator at a designated main tap is usually fixed for a reference value. It is possible to adjust the several attenuators at other taps to shape the waveform of the received signal so as to minimize intersymbol interference. Greater adjustment flexibility is inherent in transversal filters than in frequency domain networks because resistors are the only variable elements required.

Transversal filters are well known in the prior art, but the greatest problem deterring their wider application is the lack of a straightforward technique for the determination of optimum attenuator or multiplier settings. Trial and error manual methods are most generally used while the resultant "eye pattern" is observed oscillographically. Complex analog computer methods have been proposed for solving the simultaneous equations defining the operation of the transversal filter. Servomotor attenuator control systems linked with such computers have also been envisioned.

It is accordingly an object of this invention to correct signal distortion imposed by a broad group of transmission lines and to accomplish this correction quickly, exactly and automatically.

It is a further object of this invention to achieve distortion correction optimally with a minimum of apparatus complexity and with precision and dispatch.

It is another object of this invention to secure fast and accurate automatic equalization of a distorting transmission medium with assurance that the equalization realized is optimum and free of the perturbations of noise in the transmission medium.

It is a more specific object of this invention to establish attenuator settings for a transversal filter in a straightforward, systematic manner without requiring analog computations or oscillographic observations.

These objects and others are accomplished according to this invention by subjecting a transversal filter to a plurality of test pulses which have traversed the transmission medium to be compensated during an initial training period. Based on a determination solely of the polarity of the distortion present at such sampling instants as are associated with available taps on the delay line portion of the transversal filter, the attenuators associated with all taps are adjusted inversely in polarity by fixed incremental amounts for each test pulse until the distortion achieved at the sampled instants has been reduced to an amount less than the size of the increment chosen.

In an illustrative embodiment, the attenuator associated with each tap but the main tap on the delay line portion of a transversal filter is comprised of a ladder network with uniform incremental transmission levels. The connection of the several transmission levels available on these ladders to an inverting amplifier associated therewith is controlled by a reversible counter. A common summing amplifier combining the direct output of the designated main tap with the attenuated outputs of all taps leading and lagging the main tap drives a zero-level threshold or slicing circuit for polarity determination. A shift register having as many stages as there are taps on the delay line subject to attenuation stores the polarity indications as each test pulse completely traverses the delay line. A main counter advances the shift register in synchronism with the travel of the test pulse by each delay line tap and when the test pulse has completed its traverse of the delay line gates the shift register contents to the reversible counters associated with each attenuator in such a way as to advance or retard the connection point on the ladder attenuator one incremental step in opposition to the polarity indication stored in the shift register. The transmission of test pulses is continued and the stepping of the attenuators repeated until the largest distortion component is within the range of the incremental attenuation step levels chosen. The only significant uncompensated distortion remaining is that which lies beyond the finite length of the delay line.

Associated with the input to the delay line is a peak detector whose function is to detect the presence of the main portion of the test pulse and to enable the main counter controlling the shift register.

Another aspect of the invention relates to the normalization of the output of the main summing amplifier. A high-level slicing circuit responsive to the output of the main summer controls an additional attenuator-counter circuit at the input to the delay line to effect uniform peak levels for the output of the equalizer. This attenuator-counter is similar in concept to the attenuator-counters associated with the outputs of the delay line taps. It is operated step fashion once for every test pulse.

At the end of the training period the attenuators are left in their final state for message data equalization. The peak detector is disconnected from the input to the delay line. The transversal filter is now conditioned to correct subsequently received intelligence signals.

An important feature of this invention is the combining of the inverting and summing functions for all delay line taps of the transversal filter in a single common amplifier.

A further feature of this invention is the use of binary memory cells such as shift registers to store merely a polarity indication of the distortion at each sampling interval rather than the amount of such distortion.

The invention will be more clearly understood and other objects, features and advantages thereof will become apparent during the course of the following detailed description of an illustrative embodiment of the principles of the invention and the drawings in which.

Figure 1:
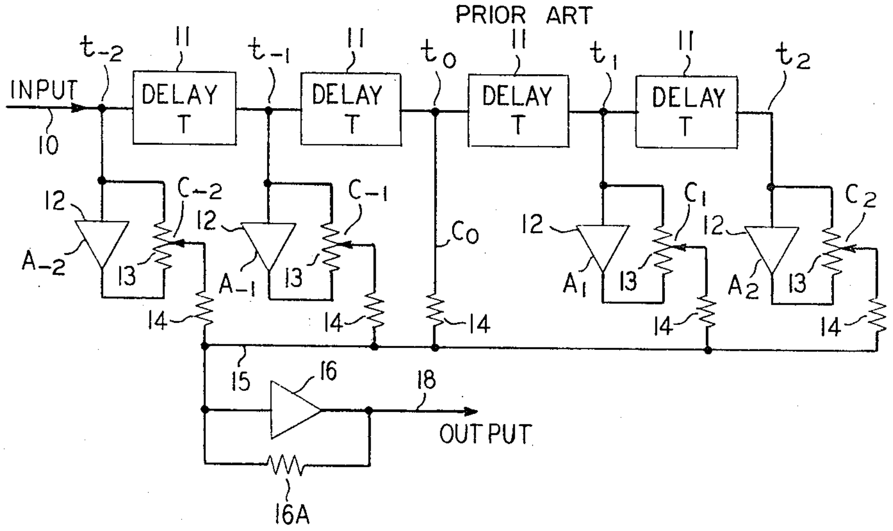
FIG. 1 PRIOR ART
FIG. 1 is a block schematic diagram of the transversal filter of the prior art requiring an inverting amplifier at each adjustable tap.

Referring now to the drawings, FIG. 1 shows in outline the essential elements of the transversal filter of the prior art as represented, for example, by U.S. Patent No. 2,263,376 granted to Blumlein, Kallmann and Percival on November 18, 1941. The transversal filter comprises a delay line portion including delay units 11, having equal periods of delay T, and tapped junctions therebetween designated by times $t_{-2}$, $t_{-1}$, $t_0$, $t_1$ and $t_2$; a multiplier portion including inverting amplifiers 12 with feedback resistors 13 and summing resistors 14; and a common summing amplifier 16. Only a summing resistor 14 is provided at the main tap $c_0$ because this serves as the reference tap. The main tap is shown in this illustrative outline in the center of the delay line, but it may occur in practice at any other tap depending on the lagging or leading relation of the distortion to be corrected. A side tap is any tap other than the main tap. The number of taps shown is arbitrary; the greater is the number of taps, the greater is the range of distortion correction.

The object of the transversal equalizer is to achieve an undistorted pulse at chosen sampling pulse instants. This object is accomplished by multiplying the output from the main tap of the delay line portion by a factor arbitrarily designated unity and the output of all other taps by factors less than unity such that the contributions of pulses adjacent to the pulse being detected are reduced to as nearly zero as is practicable. Adding together the uncorrected output of the main tap and the corrected outputs of all side taps leading and lagging the main tap results in an undistorted pulse of a desired waveshape.

Figure 5A:
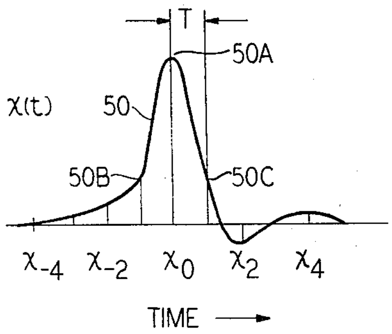
FIGS. 5A and 5B are time domain diagrams of distorted and corrected received pulses, respectively, encountered at the input and output of apparatus constructed according to this invention.
Figure 5B:
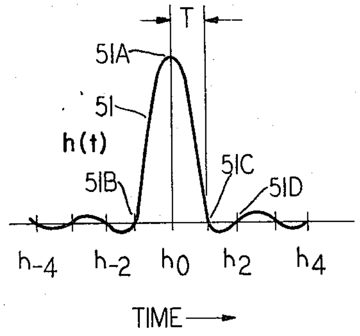

FIG. 5A shows the representative impulse response $x(t)$ for a single isolated pulse. The peak value is arbitrarily designated $x_0=1$. Other values at uniformly separated sampling times are designated $x_{-2}$, $x_{-1}$, $x_1$ and $x_2$ within the range of the equalizer of FIG. 1. An output response $h(t)$ from the equalizer is desired in the form of FIG. 5B. The responses at sampling times corresponding to $h_{-2}$, $h_{-1}$, $h_1$ and $h_2$ are to be made, as nearly as possible, zero. To accomplish this result attenuator settings for potentiometers $c_{-2}$, $c_{-1}$, $c_1$ and $c_2$ ($c_0$ is taken arbitrarily as unity in the usual case.) in FIG. 1 must be found to satisfy a set of simultaneous equations in the following form.

$$h_{-2}=0=x_0c_{-2}+x_{-1}c_{-1}+x_{-2}c_0$$
$$h_{-1}=0=x_1c_{-2}+x_0c_{-1}+x_{-1}c_0+x_{-2}c_1$$
$$h_1=0=x_2c_{-1}+x_1c_0+x_0c_1+x_{-1}c_2$$
$$h_2=0=x_2c_0+x_1c_1+x_0c_2$$

These equations can be solved in an analog computer, after the $x$'s are measured, as is disclosed, for example, in the copending application Serial No. 264,593 filed March 12, 1963, by J. R. Davey and B. R. Saltzberg.

In another copending application of M. A. Rappeport filed December 27, 1963 as Serial No. 334,051 it is pointed out that the multiplying factor for any distortion component $x_n$ can be found by measuring at the main tap the contribution of a single pulse whose peak is then incident at the side tap $x_n$, and setting the multiplier at that side tap to the inverse of the measured value. Thus, from FIG. 5A if the peak value 50A of the impulse response to a single pulse is taken as unity, the measured value of the distortion at the main tap of ordinate 50B when the peak 50A is then incident at side tap $x_1$ is $+0.25$. The multiplying factor at tap $x_1$ is then set to the inverse value $-0.25$ as a first approximation. Similarly, the multiplying factor for tap $x_{-1}$ would be set at $-0.25$ since the measured value of distortion at $x_1$ is also $+0.25$. The multiplying factor for side tap $x_{-2}$, however, would be $-0.12$, since the measured distortion at side tap $x_2$ is $+0.12$.

The settings thus obtained by Rappeport are satisfactory for single, isolated pulses. However, when successive pulses are sent as in a random data sequence, these first approximations must be further adjusted by further taking into account the distortion contributed by adjacent pulses. Rappeport further discloses an analog arrangement for taking these contributions into account.

We have discovered that, since the distortion, as a function of the multiplier settings, is a piecewise linear function of these factors, with a single minimum point, optimum settings can be obtained by observing only the polarity of the distortion components as incremental adjustments of the multipliers are made. Furthermore, these incremental adjustments to the multipliers can be made at all side taps simultaneously with the assurance that progression to the optimum settings will be made without wander.

Figure 6A:
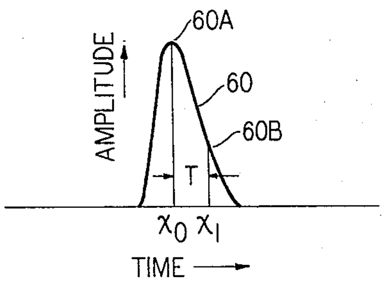
FIG. 6A is a time domain diagram of a simplified distorted received pulse for purposes of explanation of the principles of this invention.
Figure 6B:
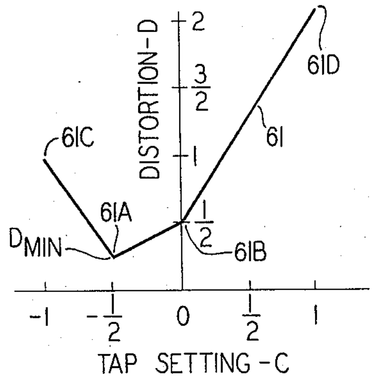
FIG. 6B is a diagram showing the effect of the adjustment of a single tap of a transversal filter on the attainment of minimum distortion therein.

The piecewise linear nature of the side tap multiplier adjustments can be illustrated by considering the impulse response 60 of FIG. 6A where the peak response 60A is taken as unity and the only distortion is the leading component 60B at half the peak value. A graph of all possible multiplier settings $c_1$ is shown in FIG. 6B. This graph is obtained by multiplying the input sequence $(1,\frac{1}{2})$ defining curve 60 in FIG. 60A by multiplier settings of unity at the main tap and $c_1$ at the leading side tap and adding all components. $(1,\frac{1}{2})$ multiplied by $(1,c_1)$ yields the sequence $(1, c_1+\frac{1}{2}, \frac{1}{2}c_1)$. By subtracting out unity, the desired response, the resultant distortion is seen to be the sum of the absolute values $|\frac{1}{2}+c_1|$ and $|\frac{1}{2}c_1|$.

This distortion D is plotted in FIG. 6B as a function of the tap setting in the range of plus and minus unity. Breaks in the curve occur at points 61A and 61B, separating three linear portions. Points 61C and 61D at settings of minus and plus unity are maxima. Points 61A and 61B are breaks at tap settings of ½ and zero. Tap setting 61A $(c_{-1}=-\frac{1}{2})$ yields the only minimum distortion of one quarter for an equalizer with a single adjustable side tap. The distortion at the single tap is zero, i.e., $h_{-1}=0$, but the residual distortion of one quarter results from the inability of the single side tap equalizer to compensate for distortion beyond its range.

FIG. 6B illustrates the "single valley" character of the distortion curve as a function of tap setting. There are no relative minima. Therefore, a steepest descent technique can be used. At any point on the distortion curve it is only necessary to observe the gradient or slope of the distortion to determine the direction the correction must take to reduce the distortion. Regardless of the initial tap setting, repeated unit corrections in a direction opposite to the gradient will converge on the single minimum point.

In a polydimensional case the simultaneous equations would define planes and the common intersection of all planes would determine the minimum distortion point.

In a practical case a given tap setting principally affects the output term when the peak value of the pulse is at that tap and has only a secondary effect on all other samples. Therefore, a comparison of the attenuated output of a side tap as the tap is adjusted in steps when successive peak values of a sample pulse are incident at that tap with the output from the main tap will indicate the direction in which the steps of attenuation are progressing. Successive comparisons at all side taps will inevitably produce the minimum distortion.

FIG. 1 further shows the use of inverting amplifiers 12 shunted by potentiometers 13 as multipliers and of operational amplifier 16 shunted by feedback resistor 16A as a summing amplifier.

Inverting amplifiers 12 with feedback through potentiometers 13 perform multiplication over the range of plus and minus one in accordance with the setting of the potentiometer in an obvious manner.

An operational amplifier is one used to perform mathematical operations. It is characterized by extremely high gain, direct-current coupling and inversion of the output with respect to the input. The nature of the feedback determines the operation performed. For example, amplifier 16 with feedback resistor 16A is an operational amplifier which performs summation with isolation of inputs by virtue of having substantially zero input impedance. The output on lead 18 is equal to the product of the value of the feedback resistor 16A and the sum of the ratios of the voltages at the inputs to resistors 14 and the values of the resistors 14. Since resistors 14 are all chosen alike, the output is directly proportional to the algebraic sum of all the voltages at the potentiometer taps and the unattenuated voltage at the main tap.

Figure 2:
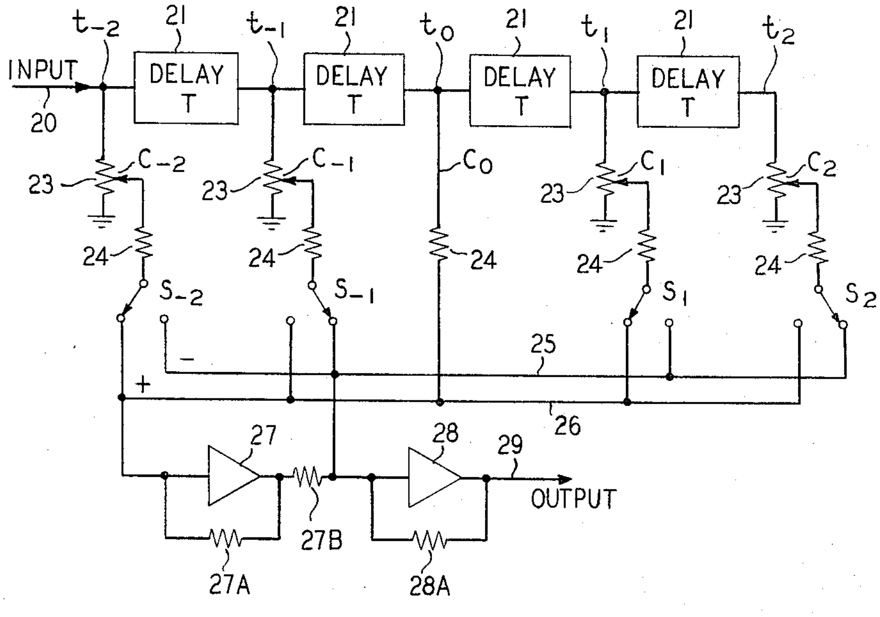
FIG. 2 is a block schematic diagram of an improved transversal filter using a common combined summing and inverting amplifier but requiring transfer switches at each adjustable tap.

A disadvantage of the transversal equalizer of FIG. 1 is that a separate inverting amplifier is required at each side tap. FIG. 2 represents an improved equalizer in which the inverting amplifiers at the side taps are eliminated. From input 20 the distorted signal is successively delayed, as before, in uniform delay blocks 21. The outputs of the side taps are made available across potentiometers 23, which can perform no inverting function. Instead of a connection from each adjustable arm to the summing amplifier, connections are made in the alternative to positive and negative summing buses 26 and 25 through isolating resistors 24 and transfer switches $s_{-2}$, $s_{-1}$, $s_1$ and $s_2$ as shown. Two operational amplifiers 27 and 28 in tandem and shunted by feedback resistors 27A and 28A perform the summing function. A summing resistor 27B connects the output of amplifier 27 to the input of amplifier 28. Positive bus 26 is connected to the input of amplifier 27 and negative bus 25 to the input of amplifier 28. Therefore, all signals on positive bus 26 appear on output lead 29 as direct signals by reason of a double inversion and signals on negative bus 25 appear as inverted signals. The circuit of FIG. 2 has an advantage over that of FIG. 1 in that inverting amplifiers are eliminated at all side taps and only two operational amplifiers perform all summing and inverting functions. However, additional circuitry (not shown) is required to determine the correct settings of the transfer switches.

Figures 3, 4:
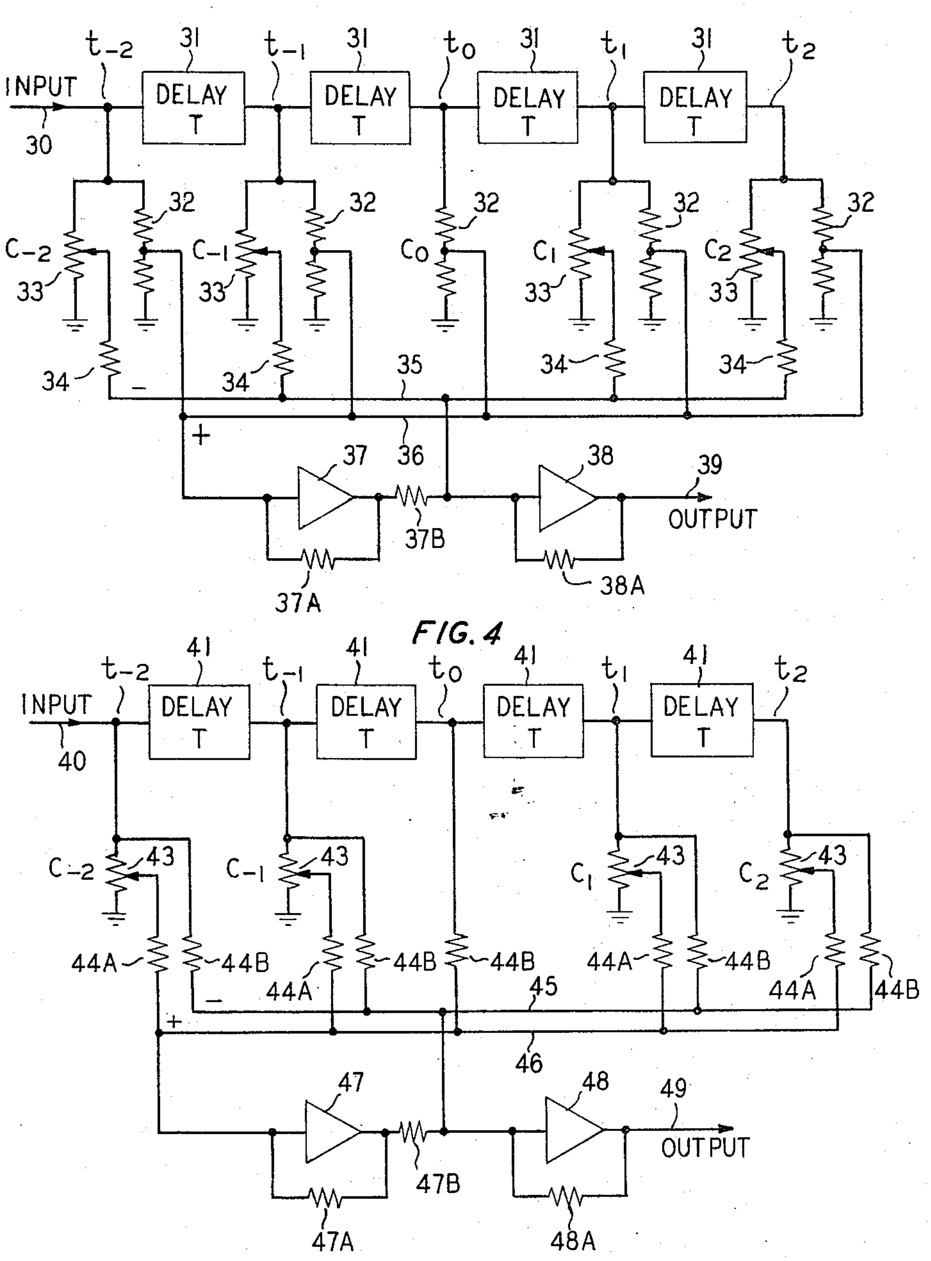
FIG. 3 is a block schematic diagram of a further improved transversal filter using a common combined summing and inverting amplifier and eliminating the transfer switches of FIG. 2.
FIG. 4 is a block schematic diagram of a preferred embodiment of a transversal filter in accordance with this invention using a common combined summing and inverting amplifier and eliminating auxiliary voltage dividers at each adjustable tap as shown in FIG. 3.

A further improved multiplying and summing circuit for a transversal equalizer is shown in FIG. 3, wherein the transfer switches of FIG. 2 are eliminated. Incoming signals on lead 30 are delayed as before in uniform delay blocks 31. The outputs of each tap including the main tap are applied across fixed voltage dividers 32, having a division ratio of one half. The divider taps are connected to a positive bus 36. The outputs of each tap but the main tap are also applied to potentiometers 33. The adjustable arms of the potentiometers connect through summing resistors 34 to negative summing bus 35. Two operational amplifiers 37 and 38 shunted by feedback resistors 37A and 38A connected in tandem relationship through resistor 37B are provided as in FIG. 2. Negative bus 35 drives the input of amplifier 38 and positive bus 36 drives amplifier 37. The output on output lead 39 is thus the difference between the signals on the positive and negative summing buses and the transfer switches are eliminated. When the adjustable arm of a potentiometer is at mid-position, there is no net output contributed by the associated tap. Movement of the adjustable arm upward effects subtractive attenuation in the output and downward, additive attenuation with respect to the signal at the center of the fixed divider. While the circuit of FIG. 3 is an improvement over those of FIGS. 1 and 2, a six-decibel loss at all taps is occasioned. This is not serious, however, in the usual practical case where the distortion at the side taps is less than half the signal at the main tap and the loss can be compensated in the summing amplifiers. The fixed dividers 32 are shown to make the halving of the tap outputs more readily apparent. Since the impedance at the inputs of amplifiers 37 and 38 is zero, the lower halves of the fixed dividers are superfluous. The voltage division is a function of the ratio of the upper halves of dividers 32 and the feedback resistor 37A.

The circuit of FIG. 3 is shown thus simplified in FIG. 4. Here the fixed voltage dividers and the potentiometers are combined. The incoming distorted signal on line 40 is delayed in blocks 41. The main tap is connected to a positive bus 46 through summing resistor 44B. The side taps are connected to ground across potentiometers 43. The side taps are also connected through summing resistors 44B to a negative summing bus 45. The adjustable arms of the potentiometers are connected to positive bus 46 through summing resistors 44A. Two operational amplifiers 47 and 48 shunted by feedback resistors 47A and 48A are coupled in tandem through resistor 47B and are connected, respectively, to buses 46 and 45. The output of amplifier 48 appears on lead 49. With this arrangement the contribution of a given tap to the output can be controlled over a range of plus one (when the adjustable potentiometer arm is at the top of its travel) and minus one (when it is at the bottom of its travel). This is done by choosing feedback resistors 47A and 48A at operational amplifiers 47 and 48 to be equal to each other and to summing resistors 44A from potentiometers 43 and resistors 44B from each tap directly to amplifiers 47 and 48 to be twice the value of the feedback resistors.

Figure 8:
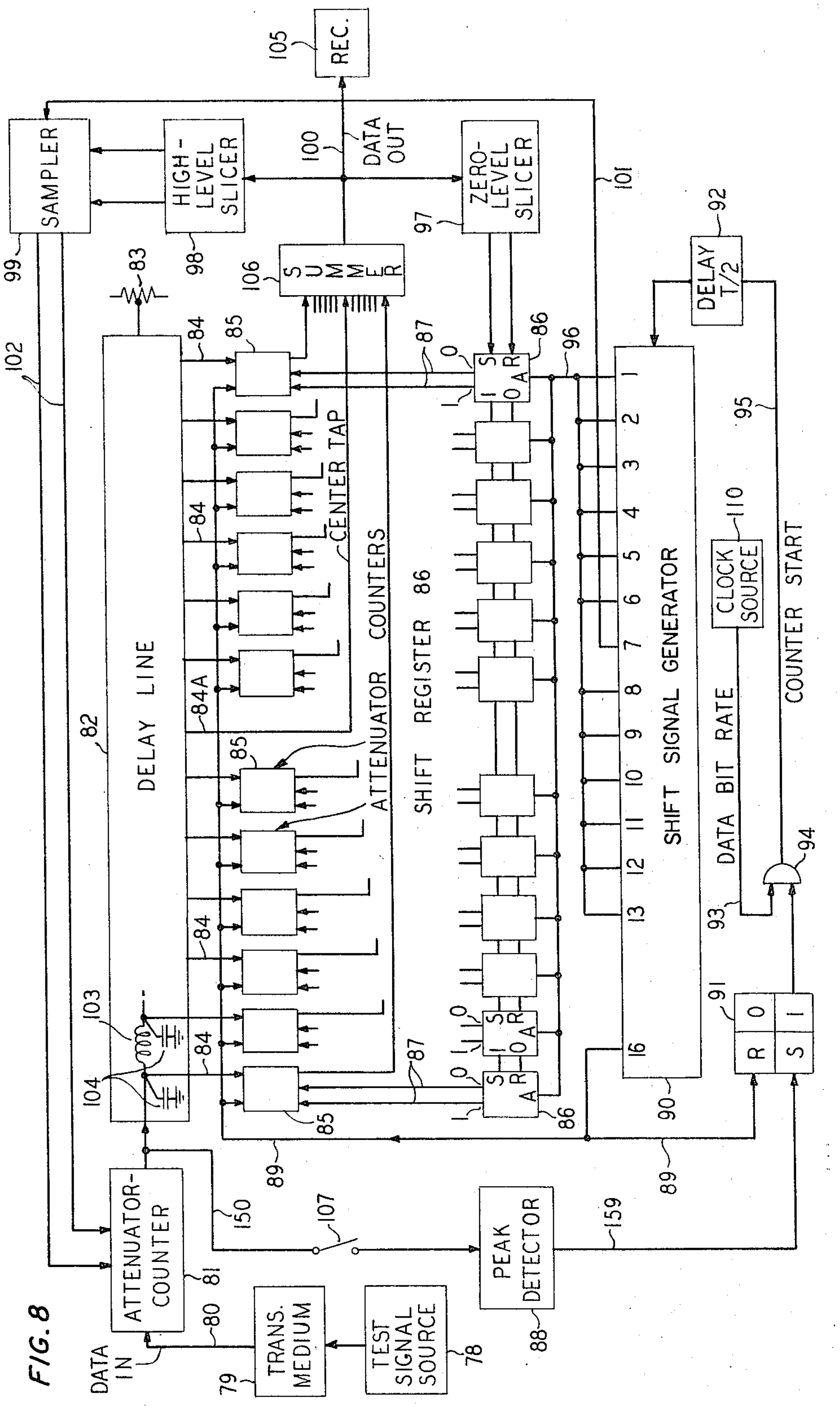
FIG. 8 is a block diagram of an illustrative embodiment of the transversal filter automatic equalization system of this invention.

A complete illustrative embodiment of an automatic transversal equalizer including means for producing optimum settings for the multiplier-attenuators according to the principles of this invention is shown in FIG. 8. This equalizer comprises a thirteen-tap delay line 82 including a main tap 84A and twelve side taps 84; a plurality of twelve attenuator-counters 85, one for each side tap; a shift register 86 having a plurality of twelve stages and controlling attenuator-counters 85; a four-stage indexing counter 90 for advancing shift register 86; a summing amplifier 106; and a zero-level slicing circuit 97. Auxiliary circuits include a peak detector 88, a flip-flop 91 and an AND-gate 94 for advancing indexing counter 90. A further feature of the invention for normalizing peak output amplitudes comprises attenuator-counter 81, sampler 99 and high-level slicing circuit 98.

Delay line 82 is conventional and comprises basically and in simplified schematic form a plurality of series-connected inductors 103 shunted to ground at junction points by capacitors 104. It is terminated in characteristic impedance 83 in order to prevent reflections. The inductors and capacitors of the delay line are selected to produce uniform delay intervals between tapping points for all frequencies of interest in the frequency band of the transmission medium. A thirteen-tap line is illustrated because a line of this length will advantageously and adequately compensate a typical voice telephone transmission path.

Summer 106 may advantageously comprise a pair of operational amplifiers as discussed in connection with FIGS. 2, 3 and 4. Center tap 84A of delay line 82 is connected to the input of the first operational amplifier through a summing resistor as in FIG. 4.

Figure 9:
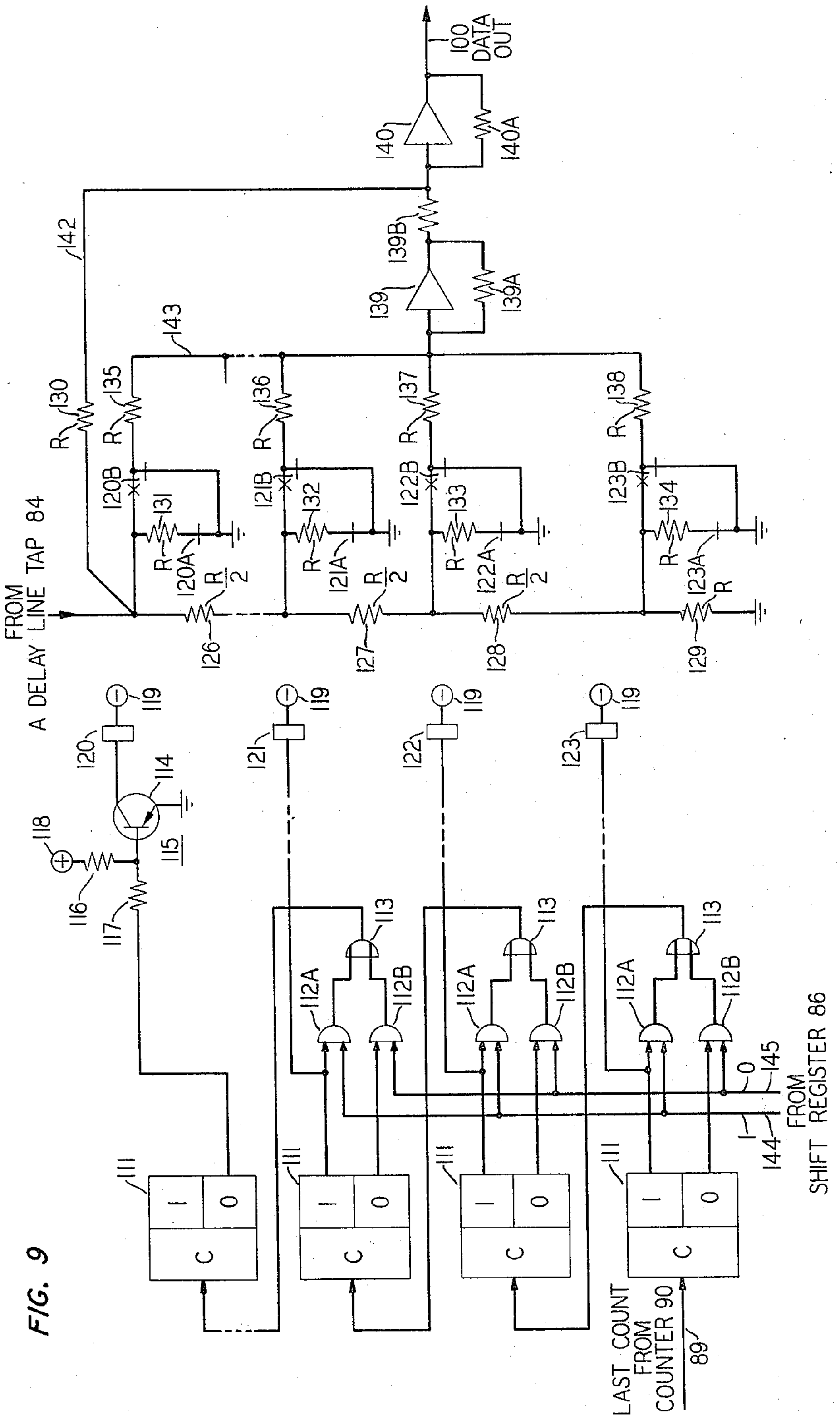
FIG. 9 is a block schematic diagram of a representative attenuator-counter useful in the practice of this invention.

Attenuator-counters 85 are connected to each side tap of delay line 82 as shown in FIG. 8. A convenient arrangement for a practical attenuator-counter is shown in FIG. 9. The attenuator portion on the right side of FIG. 9 comprises a constant-impedance ladder network of resistors arranged so that each section of the ladder including a series and shunt resistor attenuates by one half the signal at the next higher section. The ladder comprises a series chain of resistors 126 through 129 between a delay line side tap 84 and ground reference, shunted at each section by further resistors 131 through 134 as shown. The four-section ladder shown provides outputs at ⅛, ¼, ½ and full value of the input at the junction of resistors 126, 130 and 131. Each ladder step is connectable through a summing resistor 135 through 138 to a common bus 143, which coresponds to the positive bus 46 in FIG. 4. The junction of resistors 126 and 131 also connects through a summing resistor 130 to lead 142, which corresponds to negative bus 45 in FIG. 4. Lines 142 and 143 connect to the inputs of series-connected operational amplifiers 139 and 140 shunted by feedback resistors 139A and 140A, corresponding to summer 106 in FIG. 8. Resistor 139B between the two amplifiers permits the addition of the output of amplifier 139 with the signal on line 142 in amplifier 140.

The shunt resistors 131 through 134 at each ladder section connect to ground through break relay contacts 120A through 123A, respectively. Summing resistors 135 through 138, of the same value as the shunt ladder resistors, connect to the ladder steps through the make-portion of relay transfer contacts 120B through 123B. In the alternative the left ends of resistors 135 through 138 are grounded through the break portion of these same relay contacts. The relative values of the several resistors in the ladder are indicated on FIG. 9.

None, any or all of the ladder sections can be connected to bus 143 at any given time. When no ladder sections are connected to bus 143, the signal on output lead 100 is effectively equal to the delay line output multiplied by minus one. As the ladder sections are successively and separately connected to bus 143 starting at the bottom, the signal at the delay line tap is multiplied by factors of minus ⅞, ¾, ½ by algebraic addition in the operational amplifiers. When only the top step is connected to bus 143, there is complete cancellation between the signals on leads 142 and 143 in the operational amplifiers and no output appears on lead 100. More than one section can be switched to bus 143 at a time to produce the remaining negative multiplying factors in steps of one-eighth. After the top section of the ladder is reached other ladder sections can simultaneously be switched to bus 143 to obtain positive multiplying factors up to ⅞.

Since each ladder section produces an attenuation of one half that of the next higher section, each step can be designated in the binary numbering system according to the following Table I in which 1's indicate connection of that ladder section to bus 143.

TABLE I

| Attenuation | Ladder Sections | | | |
|---|---|---|---|---|
| | 1 | ½ | ¼ | ⅛ |
| −1 | 0 | 0 | 0 | 0 |
| −⅞ | 0 | 0 | 0 | 1 |
| −¾ | 0 | 0 | 1 | 0 |
| −⅝ | 0 | 0 | 1 | 1 |
| −½ | 0 | 1 | 0 | 0 |
| −⅜ | 0 | 1 | 0 | 1 |
| −¼ | 0 | 1 | 1 | 0 |
| −⅛ | 0 | 1 | 1 | 1 |
| 0 | 1 | 0 | 0 | 0 |
| ⅛ | 1 | 0 | 0 | 1 |
| ¼ | 1 | 0 | 1 | 0 |
| ⅜ | 1 | 0 | 1 | 1 |
| ½ | 1 | 1 | 0 | 0 |
| ⅝ | 1 | 1 | 0 | 1 |
| ¾ | 1 | 1 | 1 | 0 |
| ⅞ | 1 | 1 | 1 | 1 |

Attenuation increments can be made smaller by adding additional sections to the ladder in an obvious manner, as suggested by the breaks in lead 143 and at the junction between resistors 126 and 127. The number of ladder sections required at each tap may differ, since the amount of distortion generally decreases in moving outward from the main tap.

It is now apparent how the ladder network can be controlled by a binary counter to effect any desired multiplying factor between minus one and plus one. The left half of FIG. 9 shows an up-down counter for controlling the relay contacts at each ladder section. Four binary counters 111 are shown connected in a chain from bottom to top. Each counter is bistable and includes a complementing input C and complementary outputs "1" and "0." The input to the lower counter on lead 89 is taken from the last stage of indexing counter 90, to be described subsequently. The "1" and "0" outputs of all but the uppermost counter are connectable in the alternative under the control of a shift register 86 to the input of the next higher counter. Coincidence or AND-gates 112A and 112B have one of two inputs connected to the "1" and "0" outputs, respectively, of the associated counter stage. The remaining inputs to AND-gates 112A and 112B are controlled by "1" and "0" leads 144 and 145, respectively, from an associated stage of shift register 86. The coincidence gates produce an output only when appropriate signals are incident on the inputs simultaneously, as is well known.

The outputs of each pair of coincidence gates 112A and 112B are coupled to the inputs of the next higher counter 111 through buffer or OR-gates 113. The buffer gates produce an output when either input is activated.

The output states of counters 111 correspond to a binary number with the least significant digit represented by the first stage output. The counter shown counts up or down according to the state of the leads 144 and 145. The four-stage counter shown can count up to 16.

The "1" output of each of the three lower counter stages and the "0" output of the top stage controls a relay through a transistor switch. Relays 120 through 123 are respectively connected to the "0" output of the top stage and to the "1" outputs of the three lower stages. The switch isolates the counter output from the relay battery. The transistor switch 115, shown by way of example as interconnecting the "0" output of top stage 111 and relay 120, is typical and comprises a p-n-p junction transistor 114, having base, emitter and collector electrodes. The transistor is normally biased off by the coupling of its base electrode through resistor 116 to positive potential source 118. The emitter is grounded as shown. The collector is back biased through relay 120 by negative potential source 119. A buffer resistor 117 couples the base electrode to the "0" output of the associated counter 120. Whenever the appropriate counter output goes negative, the relay operates. Transistor switches similarly drive relays 121 through 123, although this detail is omitted from the drawing. Corresponding contacts for each relay are shown in the right half of the drawing in detached form. These have been previously described.

The uppermost counter stage, it may be noted, controls its associated relay 120 from its "0" output, whereas the lower stages control their relays from the "1" outputs. Relay 120 is thus operated alone when the counter is in the rest or "0" count condition. The output of the top section of the ladder thus opposes the direct output from the delay line tap in the right half of FIG. 9 to provide an effective multiplying factor of zero. As the counter operates in either direction from the rest condition, incremental sections of the ladder are cut in or removed in binary fashion to change the multiplying factor in an obvious manner according to Table I, keeping in mind that relay 120 is operated on the "0" count and released on the "1" count of its associated counter stage.

Again in FIG. 8 shift register 86, having a stage for each side tap, is a conventional shift register circuit. Each stage is arranged on each advance pulse on lead 96 to transfer its contents from right to left. The function of the shift register is to store the polarity indication of the output of the zero-level slicing circuit until each test pulse has completely traversed the delay line as is described below. The complementary "1" and "0" outputs of each stage control the counting direction of the attenuator-counters 85.

Indexing counter 90 is a conventional binary counting chain for controlling the advance of the shift register 86 and the stepping of the attenuator-counters 85.

Zero-level slicer 97 is a threshold circuit having a "1" or "0" output according to whether its input is positive or negative since a ground threshold is established. It determines the state of the shift register stages depending upon the polarity of the output of summing amplifier 106.

Figure 10:
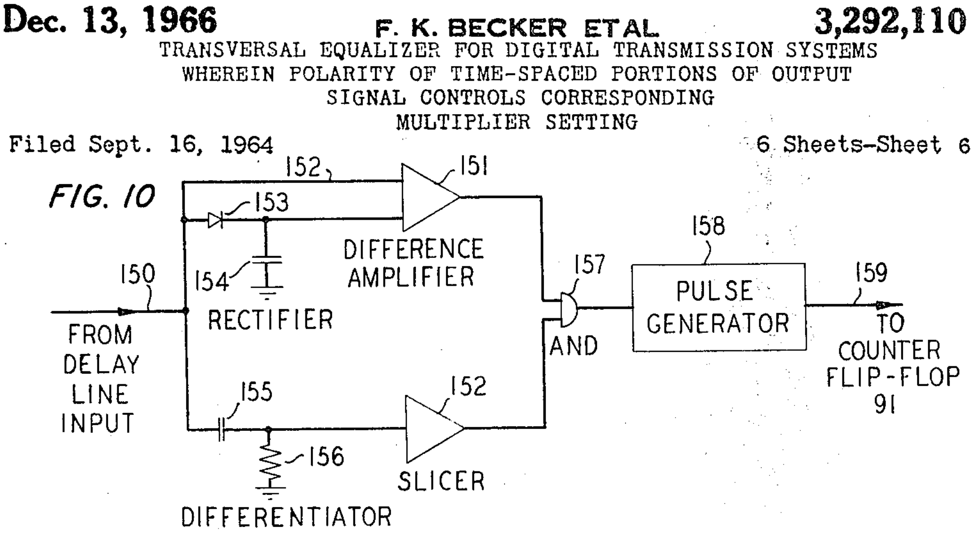
FIG. 10 is a block schematic diagram of a peak detector useful in the practice of this invention.
Figure 11:
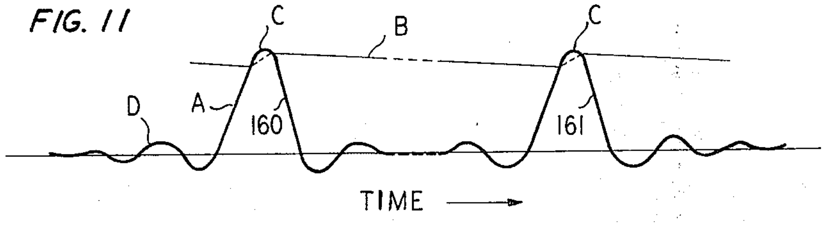
FIG. 11 is a time domain diagram illustrative of the operation of the peak detector shown in FIG. 10.

Peak detector 88 initiates the operation of indexing counter 90 when the peak amplitude of each test pulse arrives at the first tap on delay line 82 and thus controls the sampling times. A block schematic diagram of the peak detector is shown in FIG. 10. Input signals on line 150 from the delay line are incident on three parallel paths in the detector. A typical input signal is shown in FIG. 11, representing two successive test pulses 160 and 161. An output is desired only at the main peak C and not at any lesser peak, such as D. The first path is a direct connection on lead 152 to difference amplifier 151. The second path is through a rectifier 153 and integrating capacitor 154 to another input of difference amplifier 151. Capacitor 154 attempts to charge up to the level of peak C of the wave and between successive test pulses loses a small amount of charge as in curve B in FIG. 11. The output of the difference amplifier is proportional to the difference between peak C and curve B. Therefore, there is an output while the test pulse reaches peak amplitude. Minor peaks fall below wave B and are ignored. This output forms an enabling signal for coincidence gate 157. The third path is through a differentiating network including capacitor 155 and resistor 156. The differentiated output corresponding to the steepest portion of the input signal is sliced in threshold circuit 152, whose output is incident on the other input of gate 157. The output of gate 157 is thus a sharp pulse centered on the principal peak of the input wave. This output drives a pulse generator 158 to produce an output on lead 159. Pulse generator 158 can be a conventional monostable multivibrator. The output of the pulse generator sets flip-flop circuit 91 in FIG. 8, which then presents an output on its "1" lead. This output enables coincidence gate 94 which, in synchronism with clock pulses at the data bit rate corresponding to the delay tapping interval T over lead 93 from clock source 110, provides a starting impulse on lead 95 to indexing counter 90. A delay network 92, having a delay of the order of half a bit period or delay line tap spacing, is interposed between lead 95 and counter 90 to obviate an apparent race condition between the time the output of slicer 97 is stored in the right-hand stage of register 86 and the arrival of the advance pulse from counter 90.

Figure 12:
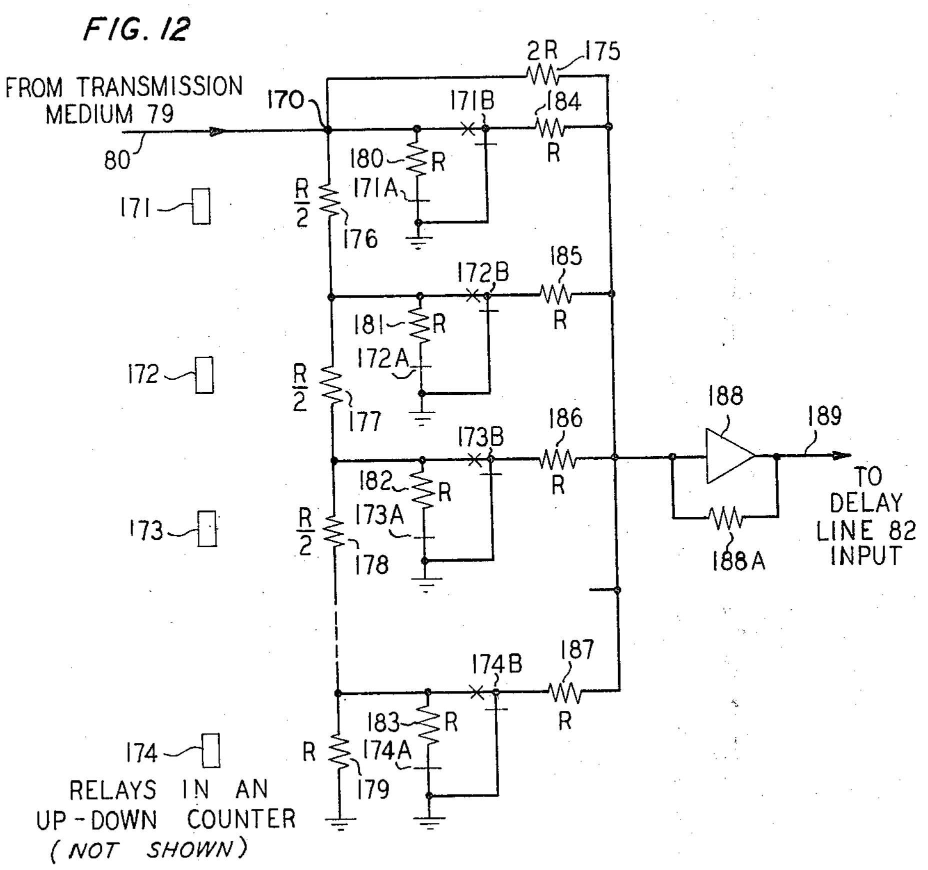
FIG. 12 is a block schematic diagram of an attenuator-counter useful in normalizing the output signal from the transversal filter system of this invention.

Attenuator-counter 81 located between the data input 80 and delay line 82 controls the peak level of the data output on lead 100 to maintain it uniform from pulse to pulse during the test period. This attenuator-counter is similar in construction to that of attenuator-counters 85 as is shown in FIG. 12. The attenuator comprises a ladder network including series resistors between input 170 and ground designated 176 through 179, shunt resistors 180 through 183, coupling resistors 184 through 187 and operational amplifier 188 shunted by feedback resistor 188A. A direct path is provided through resistor 175 from input 170 to operational amplifier 188 to establish a minimum level on lead 189. Additional increments can be added to this nominal level by connecting different steps of the ladder attenuator to the amplifier under the control of relay contacts 171A and 171B through 174A and 174B (shown in detached form). These contacts are found on relays 171 through 174 which are driven by an up-down binary counter (not shown) of the same form as that shown in the left half of FIG. 9.

The control of the up-down count for the last-mentioned counter is provided in FIG. 8 by high-level slicer 98 through sampler 99. Slicer 98 responds to the peak output from summer 106 in FIG. 8, and has a slicing threshold set at the desired output level to be maintained. When the signal peak falls below this level the output of the slicer is negative, indicating an up count is required. When the signal peak is above the threshold, the slicer indicates a down count. Sampler 99 is a gate interposed between slicer 98 and attenuator-counter 81 to which it connects by way of leads 102 and is opened by the seventh count (corresponding to the arrival of the peak of the test pulse at main tap 84A) of indexing counter 90 over lead 101. The count input of attenuator-counter 81 can be connected through an OR-gate to the up-down leads 102 to change the count whenever sampler 99 is open in a well known manner.

The over-all equalizer of FIG. 8 is coupled over input lead 80, through a demodulator if necessary depending on the type of signal transmitted, to transmission medium 79, which may be a telephone voice channel in an exemplary embodiment. The corrected output on lead 100 is delivered for sampling and decoding to a utilization circuit or receiver 105, which may be customer's data equipment.

The operation of the automatic equalizer of this invention is initiated in a training period by the transmission over medium 79 of uniform test pulses from source 78 at the remote end of the medium. Assume that all attenuator-counters 85 are set to yield zero output initially. In this condition the only usable output from delay line 82 appears at center tap 84A. A first test pulse transmitted through medium 79 arrives at the output of attenuator-counter 81 in the general form of FIG. 5A. With switch 107 closed during the training period, peak detector 88 produces an output coincident with the peak as previously explained. Flip-flop 91 is set to produce a "1" output, thus enabling coincidence gate 94. A local clock signal, which may be synchronized with the output of the peak detector when test pulses are transmitted at fixed intervals, at the data bit rate $1/T$ on lead 93 is transmitted through gate 94 to start indexing counter 90.

Coincident with the arrival of the peak of the test pulse at the input to delay line 82, a distortion component leading the peak by six bit periods is incident on center tap 84A. This component appears at the output of summer 106 and activates slicer 97, whose output then indicates the polarity only of the distortion component. The slicer polarity indication controls the state of the right-hand shift register stage accordingly. Counter 90 is advanced one count to the left and the contents of the rightmost shift register is transferred one stage to the left. At this time the leading distortion component located five bit periods from the peak of the received signal is incident at center tap 84A. Slicer 97 gives a fresh polarity indication, which is stored in the rightmost shift register cell and is subsequently advanced to the left on the second count of counter 90.

Counter 90 continues its count in this fashion until all leading and lagging distortion components of the received signal have operated slicer 97 and shift register 86 has stored a full complement of polarity indications. It may be noted that the seventh count of counter 90 does not affect the shift register. At this time the pulse peak is over the center delay line tap. Instead this count operates sampler 99, allowing for an incremental adjustment of the input attenuator-counter 81, which functions broadly as an automatic gain control.

Counter 90 continues its count after all shift register stages are full—to its last count of sixteen. This count is arbitrary and is used only because a four-stage counter has a natural count of sixteen. On the sixteenth count a gating signal appears on lead 89. Flip-flop 91 is reset thereby to prevent further advancement of the shift register until a new test pulse is received. By way of leads 87 interconnecting the shift register stages and attenuator-counters the latter are poised to count up or down in the appropriate direction to compensate for the distortion at the corresponding delay line tap. The gating signal on lead 89 is now applied as a count input to all attenuator-counters in parallel. One increment of attenuation is now set in each attenuator-counter appropriately to reduce the distortion component at each delay line tap.

Referring back to FIG. 9, an example of the operation of the up-down counter may be given. According to the initial assumption all counter stages are reset to yield a "0" output. Thus, only uppermost transfer relay 120 is operated. Identical inputs from the delay line tap are incident at the inputs of operational amplifiers 139 and 140 in summer 106. No output appears on data output lead 100. If the associated shift register now indicates that the distortion component is positive the "1" lead 144 enables all AND-gates 112A. A negative incremental multiplying factor is thus called for. The lowermost counter stage shifts to the "1" state on the sixteenth count on lead 89 from counter 90. This count is propagated through all stages of the counter in FIG. 9 through gates 112A and 113. Relay 120 is released and all others operated. The outputs of all ladder sections except the uppermost are added in operational amplifiers 139 and are opposed by the direct output from the delay line in operational amplifier 140. Therefore, a negative multiplying factor of one incremental magnitude is effected.

On the other hand, had the associated shift register indicated by a "0" output that the distortion component was negative, gates 112B would have been enabled on lead 145. When the sixteenth count from counter 90 was incident on the lowermost stage, only that stage would change state and no count would be propagated to the other stages. Thus, relay 120 would remain operated and only relay 123 would be operated in addition. The input to operational amplifier 139 would be increased by one incremental unit and a positive multiplying factor of one incremental value would be provided.

A second test pulse can now be sent, its peak detected, flip-flop 91 set and counter 90 started. On each count the distortion component of interest appears at the center tap of the delay line while the pulse peak appears at the tap whose multiplying factor was set by the corresponding component of the previous pulse. Therefore, the summer produces an output equal to the algebraic sum of the actual distortion component and the attenuated pulse. The polarity of this sum is detected by slicer 97 and stored in the shift register. The simultaneous presence of attenuated distortion components from the other taps when this sum is being measured is negligible in the usual practical case. At the end of the count when all distortion components have again been examined, the attenuators-counters are appropriately stepped by another increment.

The sequence described above is repeated with additional test pulses until the greatest distortion component is reduced substantially to zero. For the smaller distortion components maximum correction is obtained before that of the greater components. As a result the attenuator settings oscillate up and down by the incremental value about the ideal attenuator setting. The presence of line noise may add to the settling time and disturb the final values. On the average, however, the random "walk" about the optimum value will compensate for the effects of noise.

Figure 7:
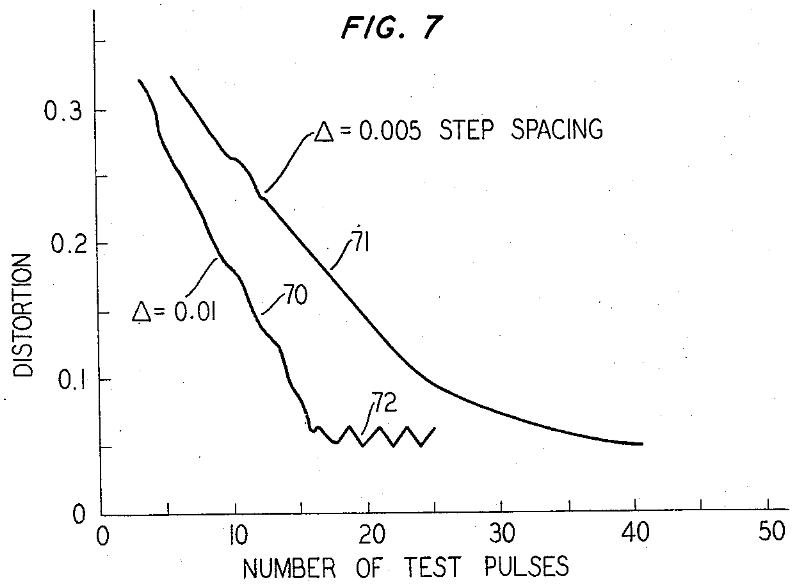
FIG. 7 is a diagram illustrating the relationship between the amount of distortion correction effected by a transversal filter system according to this invention and the number of test pulses sent during a training period at different attenuator step increments.

The amount of time needed to complete the automatic equalization and hence the number of test pulses required depends on the magnitude of the greatest distortion sample and the size of the attenuator increment. This time is called settling time. FIG. 7 illustrates the difference in settling times required to reduce the distortion to the same level using attenuator increments of 0.01 and 0.005, for a noiseless medium. Curve 70 shows that no more than twenty test pulses need be sent to attain a minimum distortion level at an increment of 0.01. Portion 72 of this wave illustrates the oscillation about the optimum setting when additional test pulses are transmitted due to the finite step increment. Curve 71 shows that approximately twice as many test pulses must be sent to achieve optimum setting with the smaller increment of 0.005.

As an example of the settling time required, assume a bit rate of 2400 per second. A test pulse is sent every 17 bits. Therefore, about 150 test pulses are sent per second. With a greatest distortion sample of about 0.2 and 64 attenuator steps between +0.3 and −0.3, a total range of 0.6, the time required for equalization is about $(0.2\times 64)/(0.6\times 150)=0.142$ second. The size of the increment thus determines both accuracy and settling time.

Once optimum equalization is attained switch 107 is opened in any convenient way either manually or after a predetermined number of test pulses, and the peak detector is released. The last attenuator settings are preserved while message data traffic is being received over the transmission medium which has been compensated. A fresh equalization is required for each transmission medium. The operational description has assumed that the attenuators were set to zero initially. This, however, is entirely unnecessary. The equalizer of this invention will proceed directly to the optimum settings regardless of initial settings provided enough test pulses are used.

The invention is, of course, not limited to the specific illustrative embodiment described. It will be readily apparent to those skilled in the art that other instrumentations of the invention may be employed. Thus, for example, the function of the shift register could be performed by a diode matrix. The ladder attenuators could be comprised of T sections individually bypassed by counter-controlled relay contacts. The transmission medium bandwidth and that of the transversal equalizer is not to be considered limited to the voice frequency band. Many other modifications of the invention will immediately occur to those skilled in the art and are embraced within the scope and spirit of the invention.

What is claimed is:

1. Apparatus for establishing optimum settings for the multipliers in a transversal equalizer intended for correction of distortion imposed upon a communication signal of multiple frequency content in passage from a signal source to a receiver through a transmission medium having a dispersive effect upon the different frequency components of signals applied thereto comprising means for transmitting a series of test impulses through said transmission medium, means for detecting the polarity of successive time-spaced samples of each test impulse traversing said transversal equalizer and its multipliers, and means for incrementally adjusting the settings of said multipliers in inverse polarity relation to successive polarity indications from said detecting means after each test impulse has traversed said equalizer.

2. Apparatus as set forth in claim 1 in which said detecting means comprises a bistable zero-level threshold circuit.

3. Apparatus as set forth in claim 1 in which said adjusting means comprises a plurality of resistive ladder attenuators having equal-valued sections, a shift register for storing the polarity indications of the successive samples detected by said detecting means, and a plurality of reversible counters adapted to connect additional steps of said ladder attenuators to said detecting means in accordance with the plurality of polarity indications stored in the several stages of said shift register.

4. Apparatus as set forth in claim 1 in which said transversal equalizer comprises a delay line having an input end connected to said transmission medium and an output end, plural lateral output taps spaced along said delay line, a nonreflective termination at said output end, and means for performing an algebraic addition of the output of all said lateral output taps.

5. Apparatus as set forth in claim 1 in combination with means connected to the input of said transversal equalizer detecting the peak amplitude of a test impulse incident thereon and producing a corresponding output signal, and counting means responsive to said last-mentioned output signal for advancing said shift register after each time-spaced sample of a test impulse is detected.

6. In combination with a delay line having an input and output end and a plurality of uniformly spaced lateral output taps, a transmission medium at the input end of said delay line having nonlinear delay and amplitude characteristics whereby signals of multiple frequency content applied thereto are differentially delayed and attenuated in traversing said medium, a nonreflective characteristic impedance termination for the output end of said delay line, a test signal source applying a series of impulses of multiple frequency content to said transmission medium, a plurality of incrementally adjustable attenuators connected to all the latter taps of said delay line but one main tap, a summing circuit common to all said attenuators and said main tap and having an output equal to the algebraic sum of the signals at all its inputs, a utilization circuit connected to said summing circuit, a slicing circuit responsive to the output of said summing circuit for producing an indication of the polarity of successive samples derived from said summing circuit, a plurality of shift register stages storing the polarity indications derived by said slicing circuit from successive samples of each test impulse, counting means having at least as many counts as the plurality of shift register stages for advancing the contents of said shift register as each sample is derived, a plurality of reversible counters associated with each adjustable attenuator adapted to advance or retard by a single increment the settings of each attenuator in accordance with the polarity of the contents of said shift register stages after a full complement of samples is derived from each test impulse, a peak detector responsive to the incidence of the peak amplitude of each test impulse at the input of said delay line, means establishing a sampling rate, and means jointly responsive to said peak detector and said establishing means operating said counting means.

7. The combination as set forth in claim 6 with means normalizing the peak output of said summing circuit comprising a threshold circuit at the output of said summing circuit producing a bipolar output according to whether signals thereat lie above or below the threshold thereof, an attenuator-counter interposed between said transmission medium and said delay line incrementally adjustable in fixed steps of attenuation about a median value corresponding to the threshold of said threshold circuit, and means gating the state of said threshold circuit during each sampling period to the counter portion of said attenuator-counter to adjust the attenuation thereof in a direction to compensate for the departure of the peak output of said summing circuit from said threshold.

8. Apparatus for establishing optimum settings for the multipliers in a transversal equalizer comprising means transmitting a succession of pulse test signals through a distorting transmission medium and into said transversal equalizer, a plurality of equally spaced lateral tops on said equalizer, a plurality of attenuators in series with each said tap but one main tap and adjustable in discrete steps, means summing the attenuator outputs and the direct output of said main tap at a common terminal, means detecting the presence of the peak amplitude of each test signal incident on said equalizer, means responsive to said peak-detecting means generating a fixed plurality of sampling pulses at intervals equivalent to the time-spacing of said taps, means controlled by said sampling-pulse generating means determining the polarity of time-spaced samples appearing at said common terminal as each test signal progresses through said equalizer, memory cell means for storing indications of the polarity of successive samples incident on said determining means, a plurality of counting means responsive to the states of said memory cell means controlling the connection of the steps of said attenuators to said summing means, and enabling means actuating each said counter means according to the indications stored in said memory cell means as each test signal completes its traversal of said equalizer.

9. The apparatus set forth in claim 8 in which said peak detecting means comprises a difference amplifier having two inputs, means coupling the test signal incident at the input of said equalizer on one input of said difference amplifier, means rectifying the test signal incident at the input of said equalizer, capacitor means integrating the rectified signal from said rectifying means at the other input of said difference amplifier, the output of said difference amplifier being a pulse broadly centered on the peak of said test signal, means differentiating the test signal incident at the input of said equalizer and producing sharp pulses at each peak of said test signal, a threshold circuit operating on the pulses from said differentiating means and passing only the pulse corresponding to the maximum amplitude of said test signal, a coincidence circuit jointly responsive to said difference amplifier and to said threshold circuit and having an output only at the peak of said test signal, and a pulse generator producing a uniform pulse output responsive to the output of said coincidence circuit.

10. Apparatus for correcting distortion imposed upon a communication signal of multiple frequency content in passing from a signal source to a receiver through a transmission medium having dispersive and attenuating effects upon the different frequency components of signals applied thereto comprising means applying to said transmission medium a test signal having a uniform frequency content throughout the transmission band of said medium, delay line means for deriving time-spaced samples of said test signal after passage through said medium, including a main tap and a plurality of side taps, a plurality of attenuators, one being connected to each tap on said delay line but said main tap, a plurality of evenly spaced junctions on each of said plurality of attenuators, a summing circuit including two operational amplifiers in tandem, an output therefor, a first input to one of said amplifiers and a second input to the junction between said two amplifiers, means directly connecting the main tap of said delay line to the first input of said summing circuit, means directly connecting the side taps on said delay line to the second input of said summing circuit, slicer circuit means detecting the polarity of each time-spaced sample of said test signal at the output of said summing circuit, means temporarily storing the polarity indications derived in said slicer circuit until each test pulse has passed through said delay line, a plurality of reversible counters associated with the junctions on said attenuators, said counters controlling the number of said junctions in unit steps connected to the first input of said summing circuit after each test pulse has been sampled, means transferring the stored polarity indications in said storing means to said reversible counters at the end of each test pulse to cause an incremental attenuation change in opposition to the polarity of the distortion sampled at each other tap on said delay line, and means for applying the output of said summing circuit to said receiver.

11. Apparatus as set forth in claim 10 in which said storing means is a multistage shift register having as many stages as there are side taps on said delay line.

12. Apparatus as set forth in claim 10 in which said reversible counters comprise a plurality of bistable binary counter stages having a single counting input and complementary outputs, coincidence gating means connecting in the alternative the complementary outputs of each lower order stage to the input of the next higher order stage, means delivering a count signal to the input of the lowest order stage after each test pulse is sampled, means connecting the polarity indications in said storing means to said coincidence gating means in such a way that each polarity indication predetermines a count in the opposite direction in said counter stages, and a transfer relay controlled by one output of each counter stage.

13. Apparatus as set forth in claim 10 in combination with means coupled to the input of said delay line for detecting the incidence of the peak amplitude of each test pulse incident on said delay line, and means responsive to said detecting means for initiating the time-spaced sampling of the outputs of each tap on said delay line by said slicer circuit.

14. Apparatus as set forth in claim 10 in combination with means for normalizing the output delivered to said receiver by said summing circuit comprising a slicer circuit coupled to the output of said summing circuit having a threshold level corresponding to a predetermined peak amplitude appropriate to the efficient operation of said receiver and an output indicative of an input exceeding or falling below said threshold level, a step attenuator interposed between said transmission medium and said delay line, a reversible counter controlling the number of steps of said attenuator which are effective to adjust the signal level at the input of said delay line, sampling means gating the output of said slicer circuit to said counter, and means enabling said sampling means when the peak amplitude of each test pulse is incident at the main tap of said delay line.

15. Apparatus as set forth in claim 10 in which each of said attenuators comprises a first plurality of equal resistors connected between the evenly spaced junctions on said attenuators, a second plurality of equal resistors connectable from each junction on said attenuators to a reference point, a third plurality of equal resistors of the same value as those of said second plurality connectable from each of said junctions to the first input of said summing circuit, said first and second pluralities of resistors defining a ladder network with equal increments of attenuation between junctions and a constant impedance from each junction to a reference point, the ratio between resistors in said first plurality and those in said second and third pluralities being such as to attenuate a signal from a tap on said delay line successively by one half between junctions, and transfer contacts at said junctions for alternative and selective connection of said junctions to one or the other of said second and third pluralities of resistors.

16. In combination with a transmission medium for data signals an equalizer for data signals comprising means storing plural time-spaced indications of the polarity of the impulse response of said transmission medium, means incrementally adjusting in inverse relation to said polarity indications time-spaced multiplying factors operating on data signals transmitted through said medium and deriving a plurality of product signals, and output means combining said product signals to obtain single response signals substantially free of distortion.

17. Apparatus for establishing optimum settings for the multipliers in a transversal equalizer comprising means repeatedly determining the polarity of consecutive time-spaced samples of the response of a transmission medium to a plurality of test signals of uniform frequency content throughout the transmission band of said medium, and means responsive to the polarity of samples taken by said determining means for incrementally and simultaneously adjusting the multipliers in said transversal equalizer by discrete amounts after each test signal in a direction ultimately to reduce each sample to substantially zero.

18. Apparatus as set forth in claim 17 and means responsive to the arrival of each test signal at said transversal equalizer detecting the peak amplitude of each test signal incident on said transversal equalizer, and counting means triggered by said detecting means controlling the sampling times of said determining means during the progression of each test signal through said transversal equalizer and the operation of said adjusting means after each test signal has traversed said transversal equalizer.

19. Apparatus as set forth in claim 17 and means in series relationship with said transmission medium and said transversal equalizer incrementally attenuating the peak amplitude of each test signal incident on said transversal equalizer according as the peak amplitude of the signal emanating from said transversal equalizer exceeds or falls short of a predetermined normal level required for effective utilization of said transversal equalizer.

References Cited by the Examiner

UNITED STATES PATENTS

| | | | |
|---|---|---|---|
| 2,379,744 | 7/1945 | Pfleger | 333—18 X |
| 2,719,270 | 9/1955 | Ketchledge | 333—18 X |

References Cited by the Applicant

UNITED STATES PATENTS

| | | |
|---|---|---|
| 2,263,376 | 11/1941 | Blumlein et al. |
| 2,908,873 | 10/1959 | Bogert. |
| 2,908,874 | 10/1959 | Pierce. |
| 3,071,739 | 1/1963 | Runyon. |

FOREIGN PATENTS

| | | |
|---|---|---|
| 517,516 | 2/1940 | Great Britain. |

OTHER REFERENCES

"Experimental Transversal Equalizer," vol. 36, No. 6, pages 1429–50, November 1957, Bell System Technical Journal.

"A Transversal Equalizer for Television Circuits," vol. 39, No. 2, page 405, March 1960, Bell System Technical Journal.

"Transversal Filters," vol. 28, pages 302–310, July 1940, Proceedings of the I.R.E.

HERMAN KARL SAALBACH, *Primary Examiner.*

P. L. GENSLER, *Examiner.*